Oct. 29, 1963       G. L. HENRY ETAL       3,109,171
THREE-PULSE CANCELLER FOR COHERENT MTI SYSTEMS
Filed Feb. 6, 1961

INVENTORS
G. L. HENRY,
G. E. MARTIN
BY
ATTORNEY

AGENT

Patented Oct. 29, 1963

3,109,171
THREE-PULSE CANCELLER FOR COHERENT MTI SYSTEMS

George L. Henry, Randallstown, and George E. Martin, Crownsville, Md., assignors, by mesne assignments, to the United States of America as represented by the Secretary of the Air Force
Filed Feb. 6, 1961, Ser. No. 87,510
3 Claims. (Cl. 343—7.7)

This invention relates to cancellation circuits for MTI (moving target indication) radar systems. As is well known, in a pulsed MTI radar system the receiver output video pulses representing returns from a moving target vary in amplitude from pulse to pulse, whereas the video pulses representing returns from a fixed target are of constant amplitude. A cancellation circuit, whose operation takes advantage of this distinguishing feature in the two types of returns, is then used to eliminate the fixed target returns so that only the moving target video is applied to the display device.

A commonly used cancellation circuit is the so-called three-pulse canceller which makes comparisons between three successive video pulses from a given target to determine whether the target is moving or stationary. Present three-pulse cancellers have the property of permitting the first and last radar returns from a fixed target to pass through uncancelled. To remedy this situation and to discriminate against random radar returns, a gating circuit is sometimes employed to cancel the first two and the last two radar returns from every target, whether moving or fixed. Thus, this method reduces the number of returns for a moving target by an amount which may be insignificant for conventional search radars but which could be considerable for a rapid scan radar having relatively few returns per beamwidth.

The purpose of this invention is to provide a cancellation circuit that permits three-pulse cancellation without reducing the number of returns per target and without permitting single random pulses to pass. The details of the invention will be given with reference to the specific embodiment thereof shown in the accompanying drawing, in which FIG. 1 is a block diagram showing in simplified form an MTI radar system and the position of the cancellation circuit therein, and FIG. 2 is a block diagram of a three-pulse canceller in accordance with the invention.

Figure 1:
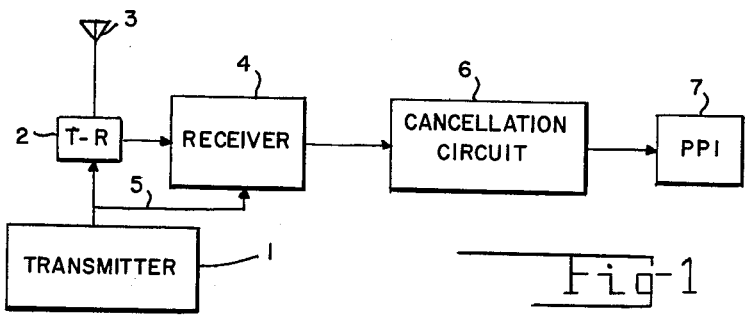

Referring to FIG. 1, transmitter 1 periodically applies short pulses of high frequency energy through transmit-receive network 2 to directional scanning antenna 3. Reflections of this energy from targets in the scanned field are received by antenna 3 and passed through T-R network 2 to the input of receiver 4. The receiver compares the phase of the received signal with that of the transmitted signal and produces a video output proportional in magnitude to the phase difference. The reference phase is supplied by a coherent oscillator in the receiver which is locked in phase with the transmitted energy at the beginning of each transmitted pulse, some of the transmitted R.F. energy being applied to the oscillator over line 5 for this purpose. In the case of a target having radial velocity relative to the transmitter, successive returns have slightly different phases due to the constantly changing range and, therefore, successive video pulses in the receiver output representing such a target have slightly different magnitudes. In the case of a target having no radial velocity the range remains constant, and hence the phase of the returning energy relative to the phase of transmitted energy remains constant and, as a result, the magnitude of the video pulses remains constant. Based on this distinguishing feature, the cancellation circuit 6 eliminates the fixed target video and permits only the moving target video to be applied to the plan position indicator 7 for display.

Figure 2:
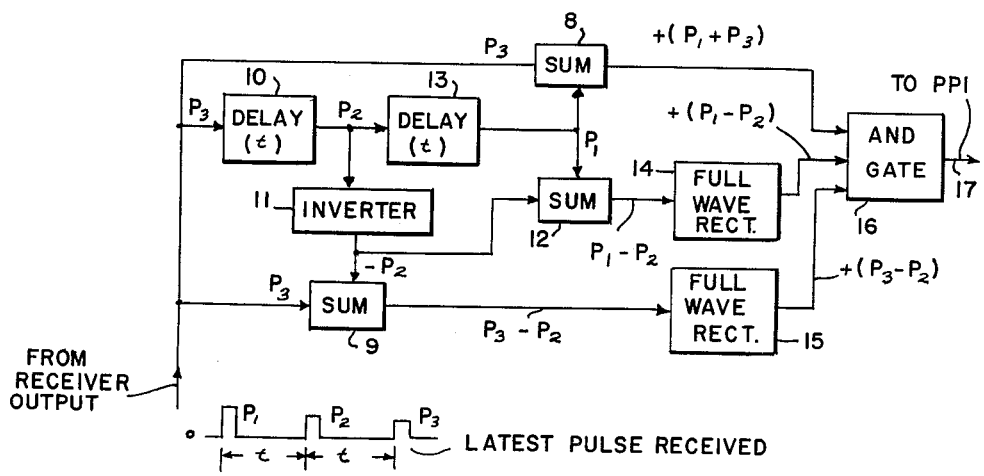

A cancellation circuit 6 in accordance with the invention is shown in FIG. 2. Pulses $P_1$, $P_2$ and $P_3$ at the input of the cancellation circuit represent three successive returns from a given target, the pulse $P_3$ being the latest received of the three. The circuit will produce an output pulse only if all of the following three conditions are met:

(1) $P_2$ is different from $P_1$ in magnitude
(2) $P_2$ is different from $P_3$ in magnitude
(3) $P_1$ and $P_3$ are not both zero The conditions illustrated in FIG. 2 are those existing at the time of pulse $P_3$. Thus $P_3$ is applied to adding circuits 8 and 9 and to delay device 10, $P_2$, having been delayed by an interval $t$ in delay device 10 and reversed in polarity by inverter 11, is applied to adder 9 and adder 12, and $P_1$, having been delayed by an interval $2t$ in delay devices 10 and 13, is applied to adder 12. The delay $t$, produced by each of delay devices 10 and 13, equals the pulse repetition interval.

Each of the adding circuits 8, 9 and 12 produces an output pulse equal to the algebraic sum of the two input pulses. Thus, the output of adder 8 is a positive pulse of magnitude $P_1+P_3$, the output of adder 9 is a pulse of magnitude $P_3-P_2$ and either polarity depending upon which of the pulses $P_3$ and $P_2$ is the greater, and the output of adder 12 is a pulse of magnitude $P_1-P_2$ and of either polarity depending upon the relative magnitudes of $P_1$ and $P_2$. Full-wave rectifiers 14 and 15 insure that the pulses applied to AND gate 16 are positive regardless of the polarity of the pulses produced by adders 9 and 12. The polarities shown are simply those of a specific example. The AND gate can be designed to operate with inputs of either polarity but each input signal should be unipolar.

AND gate 16, as is well known in the art, is a circuit which will produce an output pulse on line 17 only when all of its input circuits are simultaneously energized. Consequently, if $P_2=P_1$ or $P_3$, or if $P_2=P_1=P_3$, one or two of the three AND gate inputs will not be energized and no output will occur from the cancellation circuit. Also, if $P_1$ and $P_3$ are both zero, as would be the case for a random pulse, the output of adder 8 would be zero and no output would occur from the cancellation circuit. Therefore any received pulse $P_2$ will cause an output on line 17 only if the three conditions set out above are satisfied.

We claim:

1. A three-pulse cancellation circuit for an MTI radar system having a pulse repetition interval $t$, comprising: an electrical network having an input circuit for receiving video pulses from the output of an MTI receiver and three output circuits, said network comprising means operative during the time of occurrence of any video pulse in said input circuit to produce a pulse in one of said output circuits proportional in magnitude to the sum of the magnitudes of said video pulse and any pulse applied to said input circuit at a time $2t$ earlier than said video pulse, means operative during the time of occurrence of any video pulse in said input circuit to produce a pulse in another of said output circuits proportional in magnitude to the difference in magnitudes of any pulse applied to said input circuit at a time $t$ earlier than said video pulse and any pulse applied at a time $2t$ earlier than said video pulse, and means operative during the time of occurrence of any video pulse in said input circuit to produce a pulse in the remaining output circuit having a magnitude rtional to the difference in magnitudes between said pulse and any pulse applied to said input circuit at a t earlier than said video pulse; and means coupled to ree outputs of said network for producing a pulse when pulses occur simultaneously in all three of the its of said network.

A three-pulse cancellation circuit for an MTI radar n having a pulse repetition period $t$ comprising: an circuit for receiving video pulses from the output MTI receiver; first, second and third adders each g two input circuits and an output circuit and each operative to produce a pulse in its output circuit rtional in magnitude to the algebraic sum of the itudes of two pulses applied simultaneously to its input circuits; first and second delay devices each g a delay equal to the interval $t$; means connecting video input circuit to the input of said first delay e and to one of the inputs of each of said first and d adders; a polarity reversing means; means connect- e remaining input of said second adder and an input id third adder in parallel and through said polarity sing means to the output of said first delay device; means connecting the remaining inputs of said first and third adders in parallel and through said second delay device to the output of said first delay device; and an AND gate having an input circuit connected to the output of said first adder, a second input circuit connected to the output of said second adder and a third input circuit connected to the output of said third adder, and having an output circuit constituting the output of said cancellation circuit.

3. Apparatus as claimed in claim 2 in which full-wave rectifying means are interposed between the outputs of said second and third adders and said second and third input circuits, respectively, of the AND gate.

References Cited in the file of this patent

UNITED STATES PATENTS 2,842,761     Downs _____ July 8, 1958

FOREIGN PATENTS 832,532     Great Britain _____ Apr. 13, 1960